Figure 1:
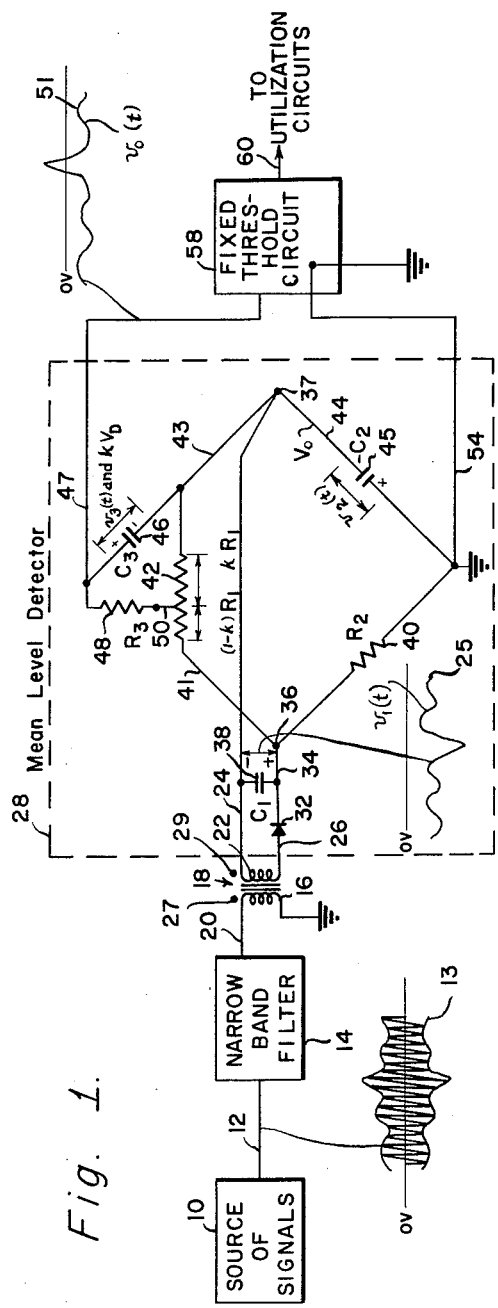

Samuel Thaler,
INVENTOR.

BY.

Walter J. Adam
ATTORNEY.

United States Patent Office 3,057,995
Patented Oct. 9, 1962

3,057,995
MEAN LEVEL DETECTOR
Samuel Thaler, Reseda, Calif., assignor to Hughes Aircraft Company, Culver City, Calif., a corporation of Delaware
Filed July 5, 1960, Ser. No. 40,958
5 Claims. (Cl. 325—477)

The invention relates to detecting circuits and particularly to a mean level detector that automatically adjusts a threshold level so as to reliably distinguish desired signals from undesired signals such as noise signals.

In pulse coding systems for communications and in pulse Doppler radar systems, for example, information or target signals must be detected in the presence of noise and other undesired signals of varying amplitudes. In Doppler radar systems, a predetermined threshold level is utilized to indicate the presence of a target signal when the amplitude of the video signal detected from the filtered input signal is greater than the threshold level. The amplitude of the filtered and detected signal has been found to be practical criterion for distinguishing target signals from noise and clutter signals. However, with any set threshold level, both target signals and noise signals such as receiver noise, thermal noise, main lobe clutter or side lobe clutter may exceed the threshold level to indicate the presence of a target. Also, variations of gain in the circuits preceding the detector may cause the threshold level to be exceeded in the absence of a target signal or cause a target signal to have a small peak amplitude below the threshold level. For providing reliable detection of a signal in the presence of noise, it is desirable that a detecting system have a constant false alarm rate or false code rate which is the number of indications of target or pulsed information signals erroneously detected per unit of time when only noise is present. A substantially constant false alarm rate allows the selection of a threshold level that provides the greatest chance of indicating a target when a target is present while limiting the chance of indicating a target when none is present. Also, in coded communication systems it is desirable that a threshold level be set that provides a constant false code rate so as to have the greatest chance of accurately detecting the presence of informational pulses in the presence of noise signals.

Some prior art methods of maintaining a constant false alarm rate are to use a limiter circuit followed by a narrow band filter and a conventional detector or to use a logarithmic receiver followed by a differentiation circuit. The conventional detector circuit has the disadvantage that it does not function properly when the spectrum of the noise changes. The logarithmic receiver controls the amplitude of the noise but is complex because of a required plurality of components. A detector circuit usable in radar or in communication systems that responds to target or information signals to provide a reliable indication thereof and to provide a controlled false alarm rate in the presence of noise signals of varying levels, would be very valuable to the art.

It is therefore an object of this invention to provide an improved and simplified detector circuit that automatically adjusts itself so that the false alarm rate is constant despite changes in the level of noise signals accompanying the input signal.

It is a further object of this invention to provide a detector circuit for controlling the frequency at which a noise voltage crosses a threshold level despite variations in the average noise power.

It is a still further object of this invention to provide a detector circuit that utilizes passive elements so as to have a minimum voltage drift.

It is another object of this invention to provide a detector circuit that separates the input signal into two parts for responding both to the mean level of the noise signal and to the fast amplitude fluctuations of the input signal so as to utilize the mean level of the noise signal to establish a bias voltage proportional to the average noise signal level.

Briefly, the mean level detector circuit in accordance with this invention includes a diode detector coupled at a first and second junction point to a bridge type post detection filter arrangement. A first filter having a relatively long time constant is provided with a resistor and capacitor coupled respectively in series between the first and second junction point to respond primarily to the mean level of the noise components of an input signal. A second filter having a relatively short time constant is provided with a variable resistor, a fixed resistor and a capacitor coupled respectively in series between the first and second junction points and responding both to the mean level of the noise components and to rapid amplitude fluctuations of the mean level caused by noise components and desired components of the input signal.

The output signal is derived across the two capacitors in the first and second filters so that the mean level of the signal appearing across the capacitor in the first filter is subtracted from the mean level of the signal appearing across the capacitor in the second filter. The result of this subtraction operation is to oppose the tendency of the voltage across the capacitor in the second filter to exceed a fixed threshold level, thus providing an output signal with a bias voltage that is proportional to the mean level of the detected input signal. The variable resistor allows selection of a constant of proportionality that relates the bias voltage of the output signal to the mean level of the input signal as well as to control attenuation of the noise fluctuations of the output signal. Thus, a substantially constant false alarm rate may be selected by adjusting the variable resistor.

Figure 2:
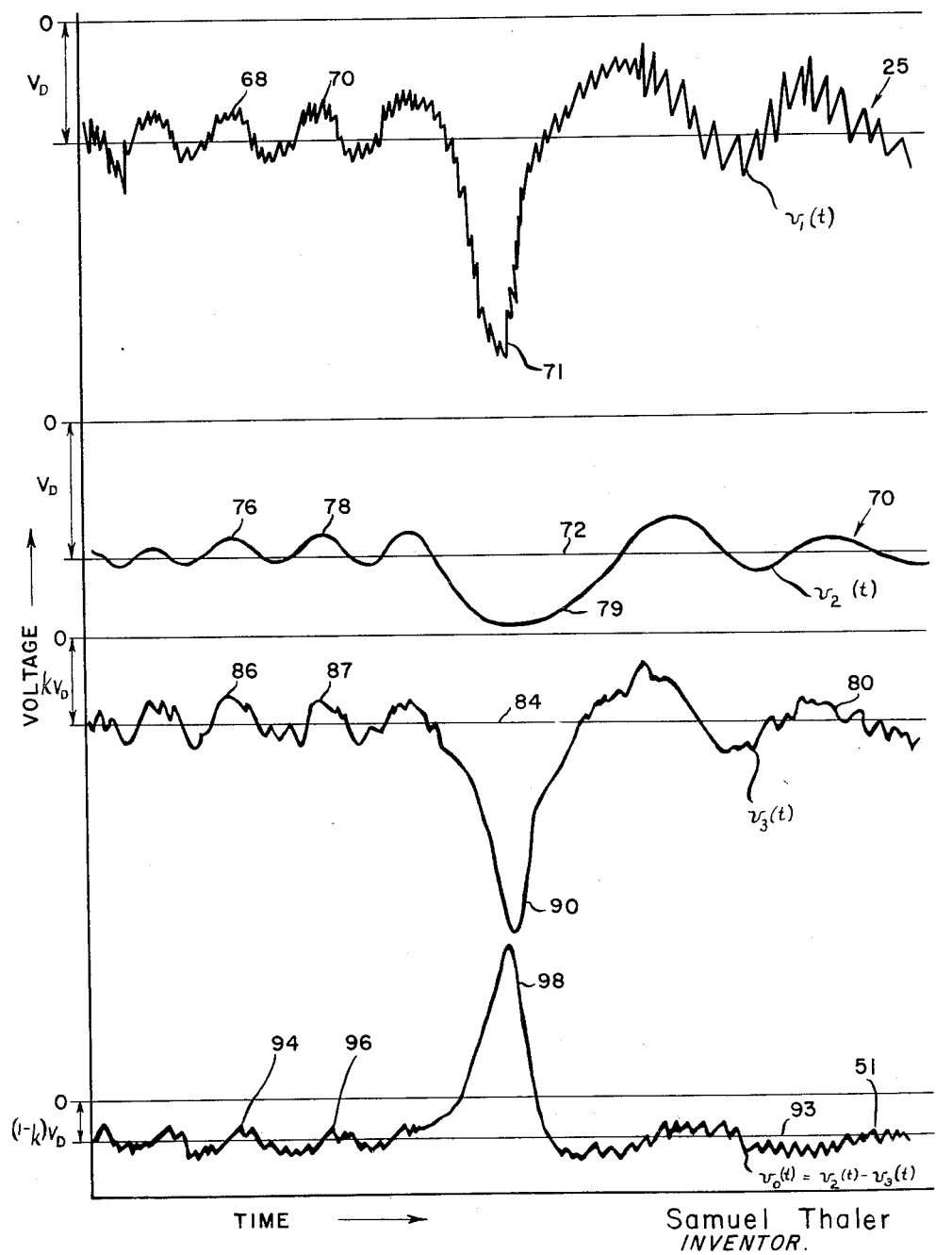

The novel features which are believed to be characteristic of this invention, both as to its organization and method of operation, together with further objects and advantages thereof, will be better understood from the following description considered in connection with the accompanying drawings, in which:

FIG. 1 is a schematic circuit diagram of the mean level detector in accordance with the invention; and FIG. 2 is a graph of voltage versus time showing waveforms for explaining the operation of the mean level detector of FIG. 1.

Referring first to FIG. 1, the arrangement of the elements in the mean level detector circuit in accordance with this invention will be explained. A source of IF (intermediate frequency) signals 10 is provided which in a radar receiver system may include an antenna system and mixing circuits for developing the IF signals. In a communication system the source of signals 10 may include a conventional antenna and receiver as well as mixing circuits. The IF signals developed by the source 10 as shown by a waveform 13 are applied through a lead 12 to a narrow band filter 14 having a selected center frequency. In a radar system, for example, the filter 14 may be a conventional Doppler filter. The IF signals of the waveform 13 are then applied through a lead 20 to a first winding 16 of an isolating transformer 18. A second winding 22 of the transformer 18 couples the IF signals through leads 24 and 26 to a mean level detector circuit 28. The transformer 18 may have a polarity relation as indicated by dots 27 and 29. The IF signal on the lead 26 is applied through the anode to cathode paths of a detecting diode 32 and through a lead 34 to a junction point 36. A filtering capacitor 38 having a relatively small value is coupled between the leads 24 and 34 for storing current passed through the diode 32 and for eliminating high frequency components from a detected or video signal of a waveform 25. The video signal of the waveform 25 is developed across the capacitor 38 and is applied through the lead 24 to a junction point 37. Thus, the diode 32 and the capacitor 38 provide a conventional detection operation.

The detected signal at the junction point 36 is applied to ground through a resistor 40 having a value $R_2$ and is applied through a lead 41, a resistor 42 having a value $R_1$, and through a lead 43 to the junction point 37. The junction point 37 is coupled to ground through a lead 44 and a capacitor 45, having a value $C_2$, and is coupled to an output lead 47 through a lead 43 and a capacitor 46 having a value $C_3$. The output lead 47 is coupled to a resistor 48, having a value $R_3$, which, in turn, is coupled to a movable arm 50 contacting the resistor 42. The arm 50 and the resistor 42 form a potentiometer for controlling both the amplitude of the fluctuations and the D.C. (direct current) voltage level of an output signal of a waveform 51. Thus, a first filter is provided including the resistor 40 and capacitor 45 and having a relatively long time constant $R_2C_2$, and a second filter is provided including the resistor 48 and the capacitor 46 and having a relatively short time constant $R_3C_3$. The output lead 47 is coupled to a threshold circuit 58 which may have a fixed threshold level such as ground potential for determining the presence of a target or desired signal of the waveform 51. An output lead 54 is coupled from ground to the threshold circuit 58. Signals exceeding the fixed threshold level of the circuit 58 are applied through a lead 60 to utilization circuits (not shown), which circuits are well known in the art.

In the operation of the mean level detector, the envelope of the video or detected signal developed across the capacitor 38 is shown in FIG. 2 as the waveform 25 having a varying voltage $v_1(t)$. The signal of the waveform 25 has a D.C. level $V_D$ which is the average voltage over an infinitely long period of time. The envelope signal of the waveform 25 includes a plurality of amplitude variations such as 68 and 70 having relatively slow rates of amplitude change resulting from noise variations, for example, at the source of signals 10. Also, the signal of the waveform 25 includes a relatively large negative amplitude variation 71 having a fast rate of amplitude change and which may be a target signal or a desired informational signal. It is to be noted that over a relatively long period of time the amplitude variations resulting from noise signals may vary sufficiently in level to exceed a threshold level, as will be explained subsequently. The envelope signal of the waveform 25 is shown filtered by the capacitor 38 which removes high frequency signal components therefrom.

In response to the signal of the waveform 25, the filtering action of the resistor 40 and the capacitor 45 develops a varying voltage $v_2(t)$ across the capacitor 45 as shown by a waveform 70, which represents a mean voltage level caused by noise components of the video signal of the waveform 25. The signal of the waveform 70 has a D.C. level 72 at a voltage $V_D$ below ground potential, which D.C. voltage appears across the capacitor 45. Thus, the filter $R_2C_2$ develops the mean level signal of the waveform 70 generally following the relatively slow amplitude changes of the input signal of the waveform 25 but with a slight time lag and smaller amplitude as indicated by amplitude changes 76 and 78 developed from the respective amplitude changes 68 and 70. A target or desired signal 79 developed from the signal 71 of the waveform 25 is greatly attenuated in amplitude because of the long time constant of the filter $R_2C_2$.

The signal developed across the capacitor 46 in response to the relatively short time constant of the filter $R_3C_3$ is shown by a waveform 80 which is the mean voltage level resulting from both signal and noise components of the detected input signal of the waveform 25 and may be represented as $v_3(t)$. The signal of the waveform 80 has a D.C. level 84 at a voltage $kV_D$, where $k$ is the ratio of the resistance between the contact point of the arm 50 on the resistor 42 and the lead 43 to the total resistance between the leads 41 and 43, and may have a value between 0 and 1. The signal of the waveform 80 includes components of the signal of the waveform 25 resulting from the desired signal 71 which has a rapid rate of amplitude change and resulting from noise fluctuations which have a relatively slow rate of amplitude change. Amplitude changes such as 86 and 87 including both high frequency and low frequency components of the waveform 25 are developed from respective amplitude changes 68 and 70. A target signal 90 includes the relatively high frequency voltage changes of the target signal 71 of the waveform 25 and is attenuated by the voltage divider including the resistor 42.

The relative polarity of the signals of the waveforms 70 and 80 are indicated by the respective (+) and (−) symbols on the plates of the capacitors 45 and 46, with the plates on both capacitors having the (−) charge thereon coupled to the junction point 37. Thus, the signals of the waveforms 70 and 80 are summed between the output leads 54 and 47 with the signal of the waveform 80 inverted in polarity from that polarity shown in FIG. 2 so that the signals are summed with opposite polarity. The signal of the waveform 70 is thus subtracted from the signal of the waveform 80. Therefore, the output signal of the waveform 51, which has the mean level of the noise components subtracted therefrom, is developed on the output lead 47 which output signal may be represented by a voltage $v_0(t)$ equal to $v_2(t) - v_3(t)$. The signal of the waveform 51 may have a D.C. level or bias voltage 93 with a level determined by the voltage division operation of the resistor 42 and having a level $(1-k)V_D$ below ground potential. Amplitude changes 94 and 96 resulting respectively from the slow amplitude changes 68 and 70 have relatively small peak amplitudes about the bias voltage $(1-k)V_D$. A target signal 98 is decreased in amplitude from that of the target signal 71 of the waveform 25 but has an amplitude substantially greater than the amplitude of the noise fluctuations such as the amplitude changes 94 and 96. Thus, when the threshold level of the circuit 58 is set at 0 volts, the amplitude of noise signals, which may have a greater amplitude in the video signal of the waveform 25 than that of the target signal 71, is greatly minimized so that substantially only target signals such as 98 are applied through the lead 60 to the utilization circuits. Because the circuit in accordance with this invention greatly suppresses slow amplitude variations of the noise fluctuations and provides a bias voltage 93 proportional to noise level, a constant false alarm rate may be selected by varying the setting of the potentiometer 42, 50.

In order to provide selection of the D.C. level 93 relative to the threshold level of 0 volts, the arm 50 may be moved along the potentiometer resistor 42 so as to divide the amplitude of the D.C. voltage $V_D$ as well as to change the amplitude of the fluctuations of the varying voltage $v_0(t)$. When $k$ is equal to 0, the arm 50 is coupled directly to the lead 43 and to the junction point 37 causing the D.C. signal $kV_D$ across the capacitor 46 to be zero and to prevent amplitude variations of the waveform 80 from occurring. Also when $k$ is equal to 0, the variations and direct current value of voltage $v_2(t)$ of the waveform 70 are applied to the output lead 47, but because of the polarity of the direct current components of the voltage $v_2(t)$ across the capacitor 45, are always below the threshold level of 0 volts. For this setting when $k$ is equal to 0, the D.C. voltage level 93 is the same as the D.C. level 72 of the waveform 70. When $k$ is equal to 1 the arm 50 is directly coupled to the lead 41 and the D.C. voltage level or bias voltage 93 is at ground potential so that the signals of the waveform 51 are amplitude excursions above and below the 0 volt threshold level. Thus, as $k$ is increased from 0 to 1, the magnitude of the D.C. level 93 of the output signal $v_o$ of the waveform 51 is raised and amplitude variations such as 94 and 96 resulting from noise components of the input signal of the waveform 25 may have a relatively large amplitude similar to that of the target signal 98.

Therefore, the arm 50 is adjustable to select the D.C. level 93 so that target signals such as 98 are applied through the threshold circuit 59 but so that noise excursions such as the amplitude variations 94 and 96 are sufficiently minimized to prevent false indications of a target. It is to be noted that the selected position of the arm 50 along the resistor 42 controls both the D.C. level 93 and the gain of the varying signal of the waveform 80 developed across the capacitor 46 so that the amplitude of the fluctuations of the waveform 51 are also adjusted. Therefore, a very sensitive detection arrangement is provided to reliably select a constant false alarm rate.

Thus, the operation of the potentiometer resistor 42 is to divide the voltage of both the varying and D.C. components of the mean level signal of the waveform 80 between the junction points 36 and 37, which components are developed by the relatively short time constant of the filter $R_3C_3$. The value $R_3$ of the resistor 48 may be selected with a value similar to the value $R_2$ of the resistor 40. However, the capacitor 45 may be selected with a substantially larger value than the capacitor 46 to provide a relatively long time constant in which the product of $R_2C_2$ may be 10 times the product of $R_3C_3$. Because of the passive elements utilized in the mean level detector circuit, undesired voltage drift which may be caused by temperature changes of the components, for example, is greatly eliminated.

Thus, there has been described a mean level detector circuit that divides the input signal into two parts and develops from one part a mean level voltage indicative of the noise components of the input signal, and develops from the other part a mean level voltage indicative of both the desired signal and noise components of the input signal. The mean level signal indicative of the noise components of the input signal is common to both parts and is subtracted out to form a bias voltage that substantially prevents amplitude fluctuations of the noise components of the output signal from reaching the threshold level. The detector circuit in accordance with this invention has wide use where an informational signal must be reliably detected in the presence of undesired signals of varying amplitude such as in pulse Doppler radar or in coded pulse communication systems. The circuit in accordance with this invention allows a constant false alarm rate or false code rate to be accurately selected.

I claim:

1. A mean level detector for responding to a source of intermediate frequency signals comprising a transformer having a first and second winding with the first winding coupled to the source of signals, a diode having a first end coupled to a first end of said second winding, first and second junction points coupled respectively to a second end of said second winding and to a second end of said diode, a first capacitor coupled between said first and second junction points, a first resistor coupled between said first and second junction points, a second resistor coupled between said second junction point and a source of reference potential, a second capacitor coupled between said first junction point and said source of reference potential, a third junction point, a third capacitor coupled between said first and third junction points, a third resistor coupled between said third junction point and said first resistor, and output means coupled between said third junction point and said source of reference potential.

2. A mean level detector responsive to a source of input signals having a first and second output terminal, said input signals including informational components having a relatively fast rate of amplitude change and undesired components having a relatively slow rate of amplitude change, said detector providing an adjustable direct current level to an output signal comprising a diode having a first end coupled to the first output terminal of said source of input signals, a first capacitor coupled between a second end of said diode and the second output terminal of said source of input signals, a first resistor coupled between the second end of said diode and a source of reference potential, a second capacitor coupled between said source of reference potential and the second output terminal of said source of input signals, a second resistor coupled between the second end of said diode and the second output terminal of said source of input signals, said second resistor having an arm movable along the surface thereof, a third capacitor having a first and second end with the first end coupled to the second output terminal of said source of input signals, a third resistor coupled between the second end of said third capacitor and said arm, said first resistor and second capacitor having values to form a product substantially greater than the product of values of said third capacitor and said third resistor, and output means coupled to the second end of said third capacitor, whereby said undesired components are substantially cancelled from the output signal and the direct current voltage level of said output signal is variable by moving said arm along said second resistor.

3. A mean level detecting system responsive to a source of input signals having first and second terminals to which input signals are applied, the input signals including first components having a relatively slow rate of amplitude change and second components having a relatively fast rate of amplitude change comprising diode detecting means coupled from the first and second terminals of said source of input signals to a first and second junction point, a first filter coupled between said first and second junction points, said first filter having a relatively long time constant, a second filter having one end coupled to said second junction point, said second filter having a relatively short time constant, voltage dividing means coupled between said first and second junction points and to the other end of said second filter for dividing the voltage applied thereto, and output circuit means coupled to said first and second filters, said first filter developing a mean level signal from the first components and said second filter developing a mean level signal from the first and second components so as to subtract said first components from said second components across said first and second filters and to apply an output signal to said output circuit means with said second components having a substantially greater amplitude than said first components.

4. A detecting system for developing an output signal having an adjustable direct current voltage level comprising a source of input signals including noise components and informational components, a source of reference potential, a transformer having a first and second winding with one end of said first winding coupled to said source of input signals and the other end coupled to said source of reference potential, a first and second junction point with said first junction point coupled to one end of said second winding, a diode coupled between the other end of said second winding and said second junction point, a first capacitor coupled between said first and second junction points, a first filter having a series connected resistor and capacitor with the resistor coupled between said second junction point and said source of reference potential and said capacitor coupled between said source of reference potential and said first junction point, said first filter having a relatively long time constant, a potentiometer resistor coupled between said first and second junction points, a movable tap contacting said potentiometer resistor, a second filter having a capacitor and resistor coupled in series respectively between said first junction point and said movable tap, said second filter having a relatively short time constant, and a threshold circuit coupled to said source of reference potential and to said second filter between the capacitor and resistor thereof, said threshold circuit having a fixed threshold voltage, said system substantially suppressing amplitude variations of the noise components and said movable tap varying the direct current voltage level of the output signal so that said threshold circuit reliably responds to the informational components of said input signal.

5. A detecting system for responding to an intermediate frequency input signal including informational components and noise components to develop an output signal with amplitude fluctuations of the noise components being suppressed and with a selective bias level comprising a source of the input signals, a transformer having an input winding coupled between said source of input signals and a source of reference potential and having an output winding, diode detecting means coupled across said output winding and having a first and a second output point to which an envelope signal is applied, a first resistor coupled between said first output points and said source of reference potential, a first capacitor coupled between said source of reference potential and said second output point, a second resistor coupled between said first and second output points, a movable tap contacting said second resistor, a third resistor having one end coupled to said movable tap, a second capacitor coupled between the other end of said third resistor and said second output point, said first resistor and capacitor having a relatively long time constant and said third resistor and said second capacitor having a relatively short time constant and threshold means coupled to a point between said second capacitor and said third resistor, and having a preselected threshold voltage, said system applying the output signal to said threshold means with the amplitude variations caused by said noise components suppressed so that substantially only the amplitude variations of said informational components exceed the threshold voltage of said threshold means, said movable tap providing selection of the bias level of said output signal relative to said threshold voltage.

References Cited in the file of this patent

UNITED STATES PATENTS

| | | |
|---|---|---|
| 2,141,730 | Van Loon | Dec. 27, 1938 |
| 2,173,427 | Scott | Sept. 19, 1939 |
| 2,354,508 | Dome | July 25, 1944 |
| 2,450,818 | Vermillion | Oct. 5, 1948 |